United States Patent Office 3,769,277
Patented Oct. 30, 1973

3,769,277
PREPARATION OF Δ³-4 CARBOXY CEPHALO-SPORINS HAVING A 3-VINYL OR SUBSTITUTED 3-VINYL GROUP
Alan Gibson Long, Greenford, and Niall Galbraith Weir, London, England, assignors to Glaxo Laboratories Limited, Greenford, England
No Drawing. Filed Jan. 20, 1971, Ser. No. 108,155
Claims priority, application Great Britain, May 6, 1970, 21,907/70; Jan. 12, 1971, 3,464/70, 28,194/70
Int. Cl. C07d 99/24
U.S. Cl. 260—243 C         4 Claims

ABSTRACT OF THE DISCLOSURE

The invention is concerned with the preparation of Δ³-4-carboxy cephalosporin antibiotics possessing a 3-vinyl or substituted 3-vinyl groups by condensation of 3-formyl cephalosporin compounds with a phosphorane ylid.

---

This invention is concerned with improvements in or relating to antibiotics of the cephalosporin series.

The cephalosporin compounds referred to in this specification are generally named with reference to cepham (see J. Amer. Chem. Soc. 1962, 84, 3400). The term "cephem" refers to the basic cepham structure with a single double bond. Where a dotted line bridges the 2-, 3- and 4-positions this indicates that the compound may be a ceph-2-em or ceph-3-em compound.

As is well known in the art, Δ³-4-carboxy cephalosporin antibiotics are compounds which are generally depicted by the formula

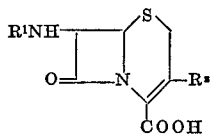

where R¹ is a carboxylic acyl group and R² is the 3-substituent.

In copending application Ser. No. 108,136 of John Colin Clark, James Kennedy, Alan Gibson Long and Niall Galbraith Weir filed on even date there are described Δ³-4-carboxyl cephalosporins antibiotics having at position 3 a substituent of the formula

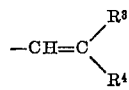

wherein R³ and R⁴ are each a hydrogen atom or an organic group.

The present invention is concerned with an advantageous method for the preparation of the cephalosporin antibiotics of said copending application.

According to the invention there is provided a process for the preparation of Δ³-4-carboxy cephalosporin antibiotics having at position 3- a substituent of the formula

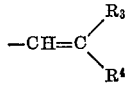

wherein R³ and R⁴ are each a hydrogen atom or an organic group (which compounds may be depicted as having the formula

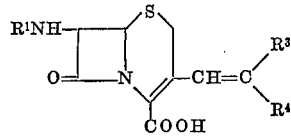

which comprises reacting a compound of the formula

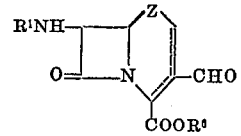

(wherein R¹, has the above defined meaning, Z is >S or >S→O and R⁶ is a carboxyl-protecting group) with a phosphorane ylid of the formula

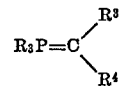

(wherein R is an organic substituting group and R³ and R⁴ have the above-defined meaning) whereafter, if necessary, any of the following reactions (D) are carried out;

(i) conversion of a Δ² isomer into the desired Δ³ isomer,
(ii) removal of any groups protecting any amino or carboxyl groups and (iii) reduction of a compound in which Z is >S→O to form the desired Z=>S compound.

The compounds obtained by the process according to the invention possess antibacterial activity against a range of gram positive and gram negative organisms and are of value in human and veterinary medicine. They may also be of value in the preparation of other 3-substituted cephalosporin compounds.

The groups R³ and/or R⁴ may be substituted or unsubstituted aliphatic, cycloaliphatic, (e.g. cyclopentyl or cyclohexyl) araliphatic (e.g. benzyl or phenylethyl) or aromatic (e.g. phenyl or 4-nitrophenyl) group.

A preferred class of compounds of the general Formula I are those having the group —CH=C(R⁵)₂ at the 3-position (wherein the R⁵ groups, which may be the same or different, are each a hydrogen atom or an alkyl group, preferably a lower alkyl group such as methyl ethyl, isopropyl, n-propyl etc., or an aryl group) and salts (e.g. alkali metal salts of such compounds).

The group R¹ in the above formula may represent a wide variety of acyl groups which may contain 1-20 carbon atoms. Specific acyl groups are illustrated in the accompanying list which is not intended to be exhaustive:

(i) R^u C_n H_{2n} CO— where R^u is aryl (carboxylic or heterocyclic), cycloalkyl, substituted aryl, substituted cycloalkyl, cyclohexadienyl, or a non-aromatic, heterocyclic, or mesoionic group, and n is an integer from 1–4. Examples of this group include phenylacetyl; substituted phenylacetyl e.g. fluorophenylacetyl, nitrophenylacetyl, aminophenylacetyl, acetoxyphenylacetyl, methoxyphenylacetyl, methylphenylacetyl, or hydroxyphenylacetyl; N,N-bis (2-chloroethyl) aminophenylpropionyl; thien-2- and 3-yl-acetyl; 4-isoxazolyl and substituted 4-isoxazolylacetyl; pyridylacetyl; tetrazolylacetyl or a sydnoneacetyl group. The substituted 4-isoxazolyl group may be a 3-aryl-5-methyl isoxazol-4-yl group, the aryl group being e.g. phenyl or halophenyl e.g. chloro- or bromophenyl. An acyl group of this type is 3-o-chlorophenyl-5-methylisoxazol-4-ylacetyl.

(ii) C_n H_{2n+1} CO— where n is an integer from 1–7. The alkyl group may be straight or branched and, if desired, may be interrupted by an oxygen or sulphur atom or substituted by e.g. a cyano group, a carboxy group, an alkoxycarbonyl group, a hydroxy group or a carboxycarbonyl group (—CO.COOH). Examples of such groups include cyanoacetyl, hexanoyl, heptanoyl, octanoyl and butylthioacetyl.

(iii) C_n H_{2n-1} CO— where n is an integer from 2–7. The alkenyl group may be straight or branched and, if desired, may be interrupted by an oxygen or a sulphur atom. An example of such a group is allylthioacetyl.

(iv) 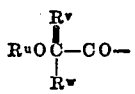

where $R^u$ has the meaning defined under (i) and in addition may be benzyl, and $R^v$ and $R^w$ which may be the same or different each represent hydrogen, phenyl, benzyl, phenethyl or lower alkyl. Examples of such groups include phenoxyacetyl, 2-phenoxy-2-phenylacetyl, benzyloxyacetyl, 2-phenoxypropionyl, 2-phenoxybutyryl, methylthiophenoxyacetyl.

(v) 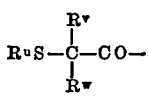

where $R^u$ has the meaning defined under (i) and, in addition, may be benzyl and $R^v$ and $R^w$ have the meanings defined under (iv). Examples of such groups include S-phenylthioacetyl, S-chlorophenylthioacetyl, S-fluorophenylthioacetyl, pyridylthioacetyl, and S-benzylthioacetyl.

(vi) $R^u Z(CH_2)_m CO-$ where $R^u$ has the meaning defined under (i) and, in addition, may be benzyl, Z is an oxygen or sulphur atom and m is an integer from 2–5. An example of such a group is S-benzylthiopropionyl.

(vii) $R^u CO-$ where $R^u$ has the meaning defined under (i). Examples of such groups include benzoyl, substituted benzoyl (e.g. aminobenzoyl), 4-isoxazolyl- and substituted 4 - isoxazolylcarbonyl, cyclopentanecarbonyl, sydnonecarbonyl, naphthoyl and substituted naphthoyl (e.g. 2-ethoxynaphthoyl), quinoxalinylcarbonyl and substituted quinoxalinylcarbonyl (e.g. 3 - carboxy-2-quinoxalinylcarbonyl). Other possible substituents for benzoyl include alkyl, alkoxy, phenyl, phenyl substituted by carboxy, alkylamido, cycloalkylamido, allylamido, phenyl(lower)alkylamido, morpholinocarbonyl, pyrrolidinocarbonyl, piperidinocarbonyl, tetrahydropyridino, furylamido or N-alkyl-N-anilino, or deriavtives thereof, and such substituents may be in the 2-or 2- and 6-positions. Examples of such substituted benzoyl groups are 2,6-dimethoxybenzoyl, 2-methylamidobenzoyl and 2-carboxybenzoyl. Where the group $R^u$ represents a substituted 4-isoxazolyl group, the substituents may be as set out above under (i). Examples of such 4-isoxazolyl groups are 3-phenyl-5-methyl-isoxazol-4-yl carbonyl, 3 - o-chlorophenyl-5-methyl-isoxazol-4-yl carbonyl and 3-(2,6-dichlorophenyl)-5-methyl-isoxazol-4-yl carbonyl.

(viii) 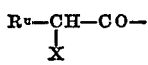

where $R^u$ has the meaning defined under (i) and X is amino, substituted amino (e.g. acylamido or a group obtained by reacting the α-aminoacylamido group of the 7-side chain with an aldehyde or ketone e.g. acetone, methylethylketone or ethyl acetoacetate, hydroxy, carboxy, esterified carboxy, azido, triazolyl, tetrazolyl, cyano, halogeno, acyloxy (e.g. formyloxy or lower alkanoyloxy) or etherified hydroxy group. Examples of such acyl groups are α-aminophenylacetyl, and α-carboxyphenylacetyl.

(ix) 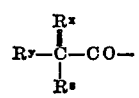

where $R^x$, $R^y$ and $R^z$ which may be the same or different may each represent lower alkyl, phenyl or substituted phenyl or $R^x$ represents hydrogen. An example of such an acyl group is triphenylmethylcarbonyl.

(x) $R^u-NH-CO-$ where $R^u$ has the meaning defined under (i) and in addition may be hydrogen, lower alkyl or halogen substituted lower alkyl. An example of such a group is $Cl(CH_2)_2 NHCO$.

(xi) 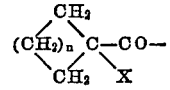

where X has the meaning defined under (viii) above and n is an integer of from 1 to 4. An example of such an acyl group is 1-aminocyclohexanecarbonyl.

(xii) Amino acyl, for example

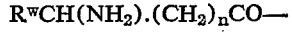

where n is an integer from 1–10, or

where m is zero or an integer from 1–10, and n is 0, 1 or 2, $R^w$ is a hydrogen atom or an alkyl, aralkyl or carboxy group or a group as defined under $R^u$ above, and Ar is an arylene group, e.g. p-phenylene or 1,4-naphthylene. Examples of such groups are disclosed in British patent specification No. 1,054,806. A group of this type is the p-aminophenylacetyl group. Other acyl groups of this type include those, e.g. 5-aminodipoyl, derived from naturally occurring amino acids, and derivtaives thereof e.g. N-benzoyl-5-aminoadipoyl.

(xiii) Substituted glyoxylyl groups of the formula

where $R^y$ is an aliphatic, araliphatic or aromatic group, e.g. a thienyl group, a phenyl group, or a mono-, di-or tri- substituted phenyl group, the substituents being, for example, one or more halogen atoms (F, Cl, Br, or I), methoxy groups, methyl groups or amino groups, or a fused benzene ring. Included in this group are also the α-carbonyl derivatives of the above substituted glyoxylyl groups.

(xiv) Formyl

Where compounds of Formula I are primarily intended for use as intermediates, important species of the group $R^1$ are:

(xv) Hydrocarbyloxycarbonyl and substituted hydrocarbyloxy groups (wherein the 7-amino group forms part of a urethane), e.g. lower alkoxycarbonyl groups (such as methoxycarbonyl, ethoxycarbonyl and t-butoxycarbonyl groups); halo lower alkoxycarbonyl groups e.g. 2,2,2-trichloroethoxycarbonyl; aralkoxycarbonyl groups such as benzyloxycarbonyl, 4-methoxybenzyloxycarbonyl, diphenylmethoxycarbonyl and 4-nitrobenzyloxycarbonyl groups; and cycloalkoxycarbonyl groups e.g. adamantyloxycarbonyl.

(xvi) Haloformyl e.g. chloroformyl.

The carboxyl blocking group $R^6$, substituting the 4-carboxyl group, is, preferably, an ester formed with an alcohol or phenol which may readily be split off at a later stage of the reaction.

The group protecting the 4-carboxyl group of Formula I may be formed with an alcohol (aliphatic or adaliphatic), phenol, silanol, stannanol or acid which may readily be split off at a later stage of the reaction.

Suitable esters thus include compounds containing as 4-ester group, a group selected from the following list which is not intended to be an exhaustive list of possible ester groups (i) $-COOCR^a R^b R^c$ wherein at least one of $R^a$, $R^b$, and $R^c$ is an electron-donor e.g. p-methoxyphenyl, 2,2,6-trimethylphenyl, 9-anthryl, methoxy, acetoxy, tetrahydrofur-2-yl, tetrahydropyran-2-yl or fur-2-yl. The remaining $R^a$, $R^b$ and $R^c$ groups may be hydrogen or organic substituting groups. Suitable ester groups of this type include p-methoxybenzyloxycarbonyl and 2,4,6-trimethylbenzyloxycarbonyl.

(ii) $-COOCR^a R^b R^c$ wherein at least one of $R^a$, $R^b$ and $R^c$ is an electron-attracting group e.g. benzoyl, p-nitrophenyl, 4-pyridyl, trichloromethyl, tribromomethyl, iodomethyl, cyanomethyl, ethoxycarbonylmethyl, arylsulphonylmethyl, 2-dimethylsulphoniumethyl, o-nitrophenyl or cyano. The remaining $R^a$, $R^b$ and $R^c$ groups may be hydrogen or organic substituting groups. Suitable esters of this type include benzoylmethoxcarbonyl, p-nitrobenzylcarbonyl, 4-pyridylmethoxcarbonyl, 2,2,2 - trichloroethoxycarbonyl and 2,2,2-tribromoethoxycarbonyl.

(iii) —$COOCR^aR^bR^c$ wherein at least two of $R^a$, $R^b$ and $R^c$ are hydrocarbon such as alkyl e.g. methyl or ethyl, or aryl e.g. phenyl and the remaining $R^a$, $R^b$ and $R^c$ group, if there is one, is hydrogen. Suitable esters of this type include, t-butyloxycarbonyl, t-amyloxycarbonyl, diphenylmethoxycarbonyl and triphenylmethoxycarbonyl.

(iv) —$COOR^d$ wherein $R^d$ is adamantyl, 2-benzyloxyphenyl, 4-methylthiophenyl or tetrahydropyran-2-yl.

Silyl esters may conveniently be prepared from a halosilane or a silazane of the formula $R^4{}_3Six$; $R^4{}_2Six_2$; $R^4{}_3Si.NR^4{}_2$; $R^4{}_3Si.NH.SiR^4{}_3$; $R^4{}_3Si.NH.COR^4$;

$R^4{}_3Si.NH.CO.NH.SiR^4{}_3$; $R^4NH.CO.NR^4.SiR^4{}_3$;

or $R^4C(OSiR^4{}_3)$ : $NSiR^4{}_3$ where X is a halogen and the various groups $R^4$, which can be the same or different, represent hydrogen atoms or alkyl, e.g. methyl, ethyl, n-propyl, iso-propyl; aryl, e.g. phenyl; or aralkyl e.g. benzyl groups.

Preferred derivatives of silanols are silyl chlorides such as for example trimethylchlorosilane and dimethyldichlorosilane.

The carboxyl groups may be regenerated from an ester by any of the usual methods; for example, acid- and base-catalysed hydrolysis (especially for silyl and stannyl esters) is generally applicable, as well as enzymically-catalysed hydrolyses; however, aqueous mixtures may be poor solvents for these compounds and they may cause isomerizations, rearrangements, side-reactions, and general destruction, so that special methods may be desirable. Five suitable methods of deesterification are:

Reactions with Lewis acids: Suitable Lewis acids for reaction with the esters incluude trifluoroacetic acid, formic acid, hyrochloric acid in acetic acid, zinc bromide in benzene and aqueous solutions or suspensions of mercuric compounds. The reaction with the Lewis acid may be improved by addition of a nucleophile such as anisole.

Reduction: Suitable systems for effecting reduction are zinc/acetic acid, zinc/formic acid, zinc/lower alcohol, zinc/pyridine, palladised-charcoal and hydrogen, electrolysis, and sodium and liquid ammonia.

Attack by nucleophiles: Suitable nucleophiles are those containing a nucleophilic oxygen or sulphur atom for example alcohols, mercaptans and water.

Oxidative methods: for example, which involve the use of hydrogen peroxide and acetic acid.

Irradiation.

Preparation of compounds of General Formula I

The 3-formyl cephalosporin compounds used as starting materials may be defined as having the general formula

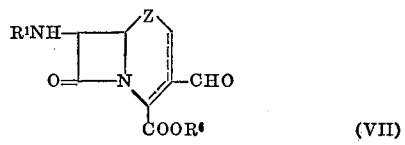

(VII)

wherein $R^1$, $R^6$ and Z have the above defined meanings.

The 3 -formyl cephalosporin compounds may be prepared as described in U.S. Pat. No. 3,351,596; British Pat. No. 1,155,024 or Dutch patent application No. 6815631. When it is desired to use a 1-oxide the processes of these specifications may be adapted to yield the desired 1-oxide Alternatively, the 1-oxide may be produced directly from the corresponding 3-formyl compound.

Phosphorane ylids which may be used in the reaction with 3-formyl cephalosporins include those having the general formula:

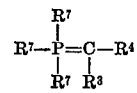

where the $R^7$ groups, which may be the same or different, are each organic groups and $R^3$ and $R^4$, which may be the same or different are each hydrogen atoms or organic groups.

The nature of the groups $R^7$ is not unduly critical since the moiety $=(R^7)_3$ does not form part of the cephalosporin derivative produced. $R^7$ may, for example, be $C_3$–$C_{10}$ alkyl, $C_5$- or $C_6$-cycloalkyl, aryl e.g. phenyl or substituted phenyl, di(lower alkyl) amino, etc.

The nature of $R^3$ and $R^4$ will depend on the nature of the compound to be produced and the reaction conditions involved. When employing cep-3-em compounds at least one of $R^3$ and $R^4$ is desirably an electronegative group. When employing ceph-3-em compounds we also prefer that the phosphorane is chosen from those having a $pK_a$ (in water: ethanol=8.2 v./v.) of 6.5–10 to facilitate the desired reaction.

When it is desired that $R^3$ and/or $R^4$ should be electronegative it may be lower alkoxycarbonyl, aryllower-alkoxycarbonyl, diaryl loweralkoxycarbonyl, loweralkylcarbonyl, cyano, etc; the aryl moiety may be phenyl or substituted phenyl, e.g. halophenyl or tolyl.

With ceph-2-em compounds, the nature of $R^3$ and $R^4$ is not so critical: they may or may not be electronegative and may be selected from hydrogen, lower alkyl, cycloalkyl, aromatic e.g. phenyl, etc. groups.

If desired, the ylid may be generated by reaction with a base stronger than the conjugate base of the phosphonium compound. Suitable bases include alkaline earth metal hydroxides, carbonates and hydrogen carbonates e.g. sodium hydrogen carbonate and disodium hydrogen phosphate. Other bases which may be used to generate ylids include the conjugate base of dimethylacetamide and dimethylformamide; tertiary nitrogen bases e.g. pyridine; the sodio or lithio derivatives of hexamethyldisilazane, alkali metal hydrides, alkylene oxides (e.g. ethylene oxide or propylene oxide) which may be potentiated with halide ion, and fluoride ion in an aprotic solvent.

The use of a base at this stage in conjunction with a ceph-2-em compound may convert the cephalosporin compound to a cep-3-em compound. This enables a convenient isomerisation to be simultaneously effected.

Reaction conditions

The reaction may be carried out by vigorously stirring the components together, e.g. at a temperature of from —80° to +100° C., preferably from —30° to +30° C. When the reaction is effected at a temperature at which one or more reactants may volatilise, a closed system may be used. The reaction may be effected in an inert or relatively inert solvent, for example, a halogenated hydrocarbon, e.g. methylene chloride; a hydrocarbon e.g. benzene; an acyclic or cyclic ether e.g. diethyl ether, tetrahydrafuran or dioxan; an amide e.g. dimethylformamide or dimethylacetamide or hexamethylphosphoramide. The course of the reaction may be followed by thin layer chromatography and by ultra-violet spectroscopy (in general, the $\lambda_{max}$. shifts to higher wavelengths as the reaction produces chromophoric groups). Disappearance of the 3-formyl group is complete when no fraction on the chromatograms goes red or orange with 2,4-dinitrophenylhydrazone.

Typical products of the process according to this invention are unsaturated esters, e.g.:

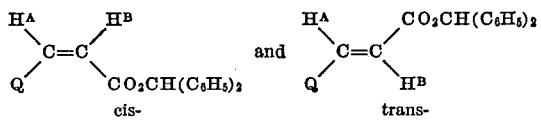

where Q has the above defined meaning. The geometrical isomers may be formed in different proportions, according to the conditions of reaction, and are separable by crystallization and chromatography. The magnetic resonances generally distinguish the isomers, $J_{AB}$ (cis) being $\not> 13$ Hz. and $J_{AB}$ (trans) being 12 to 18 Hz. Further, the methylene protons of the 2-$CH_2$— group in the cis-isomers give a clear AB-quartet, J ca. 18 Hz., whereas this quartet in the trans-isomers collapses, sometimes to a singlet.

N-deacylation

The product may be N-deacylated to yield the corresponding 7β-amino compound.

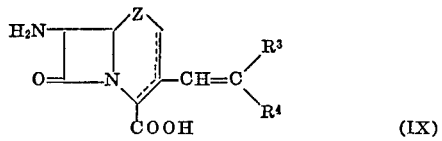

(wherein $R^3$, $R^4$ and Z have the above defined meanings) or a derivative (e.g. ester, salt or salt of ester) thereof. Acid addition salts e.g. with nitric acid or a hydrocarbyl sulphonic acid, may be formed with the free 4-COOH compound or ester thereof. Examples of hydrocarbyl sulphonic acids include alkylbenzene sulphonic acids, e.g. p-toluene sulphonic acid, and lower alkane sulphonic acid, e.g. methane sulphonic acid.

Suitable methods of N-deacylating cephalosporin derivatives having 7β-acylamido groups are described in British Pat. Nos. 1,041,985 and 1,119,806; Belgian Pat. No. 719,712 and in South African patent specification Nos. 68/5,048 and 68/5,327. Another method of N-deacylation which may be used is acid catalysis. For example, N-deformylation of a 7β-formamido group may be effected with a mineral acid at a temperature of minus 15° to +100° C., preferably +15 to 40° C. N-deformylation may be effected with the aid of a Lewis acid in a lower alkanol, preferably under substantially anhydrous conditions.

Acylation

Acylation of a compound of Formula IX (or ester, salt or salt-ester thereof), may be effected with any convenient acylation agent such as for example, an acid halide (e.g. chloride or bromide), an anhydride or mixed anhydride, e.g. with pivalic acid or formed with a haloformate, e.g. a lower alkylhaloformate, or an active ester or azide; alternatively, the acid itself can be used, together with an esterifying agent, e.g. carbonyldiimidazole or a carbodiimide such as N,N'-diethyl-, dipropyl-, or diisopropylcarbodiimide, or preferably N,N'-dicyclohexylcarbodiimide.

Acylation with an acid halide may be effected in the presence of an acid binding agent, e.g. a tertiary amine such as triethylamine, dimethylformamide, dimethylaniline; an inorganic base such as calcium carbonate or sodium bicarbonate; or an oxirane which binds hydrogen halide liberated in the acylation reaction. The oxirane is preferably a lower 1,2-alkylene oxide e.g. ethylene oxide or propylene oxide.

Protection of amino groups

When the β-acylamido group contains an amino group it will be necessary to protect this during the various reaction stages. The protecting group is conveniently one which can be removed by hydrolysis without affecting the rest of the molecule, especially the lactam and 7β-amido linkages. The amine protecting group and the esterifying group at the 4-COOH position can be removed using the same reagent. An advantageous procedure is to remove both groups at the last stage in the sequence. Protected amine groups include urethane, arylmethyl (e.g. trityl) amino, arylmethyleneamino, sulphenylamino or enamine types. Such groups can in general be removed by one or more reagents selected from dilute mineral acids e.g. dilute hydrochloric acid, concentrated organic acids, e.g. concentrated acetic acid, trifluoroacetic acid, and liquid hydrogen bromide at very low temperature, e.g. —80° C. A convenient protecting group is the t-butoxycarbonyl group, which is readily removed by hydrolysis with dilute mineral acid, e.g. dilute hydrochloric acid, or preferably with a strong acid (e.g. formic acid, trifluoroacetic acid or liquid HF) e.g. at a temperature of 0–40° C., preferably at room temperature (15–25° C.). Another convenient protecting group is the 2,2,2-trichloroethoxycarbonyl group which may be split off by an agent such as zinc/acetic acid, zinc/formic acid, zinc/lower alcohols or zinc/pyridine. The $NH_2$ group may also be protected as $NH_3^+$ by using the amino acid halide as its hydrohalide under conditions in which the amino group remains protonated.

Typical protecting groups and their methods of removal are illustrated in the following table:

| Type | Example | Usual name and analogues etc. | Usual method of removal |
| --- | --- | --- | --- |
| Urethane | HN-COCH₂Ph (C=O) | Benzyloxycarbonyl, p-methoxy | HBr/AcOH (neat); CF₃COOH (neat); liq. HBr at —80° C. |
| Do | HN-COC(CH₃)₃ (C=O) | t-Butoxycarbonyl | Dil. acid (HCl); CF₃COOH (neat). |
| Do | HN-COCHPh₂ (C=O) | Diphenylmethoxycarbonyl | CF₃COOH (neat); Dil. HCl, etc. |
| Do | HN-CO-(1-adamantyl) (C=O) | 1-adamantyloxycarbonyl | Dil. HCl. |
| Arylmethyl | HN-CPh₃ | Trityl | AcOH plus H₂O; dil. HCl. |
| Sulphenyl | HN—S—(o-NO₂-C₆H₄) | o-Nitrophenylsulphenyl, p-nitro | Dil. HCl; NaI or Na₂S₂O₃; pH 2–4; |

TABLE—Continued

| Type | Example | Usual name and analogues etc. | Usual method of removal |
|---|---|---|---|
| Enamine | (structure: N-H, O, C-CH₃, C-H, C-R) | β-Dicarbonyl:<br>R=OEt, ethyl acetoacetate;<br>R=CH₃, acetylacetone;<br>R=Ph, benzoylacetone;<br>R=OMe, methyl acetoacetate;<br>R=C₂H₅, propionylacetone;<br>and many other β-diketones. | Acid labile in varying degree; dil. AcOH or HCl, etc. |
| Arylmethylene | (structure: N=CH, HO-phenyl) | Anil (similar to β-dicarbonyl) from salicylaldehyde:<br>5-chlorosalicylaldehyde,<br>3,5-dichlorosalicylaldehyde,<br>2-hydroxy-1-naphthaldehyde,<br>3-hydroxy-pyridine-4-aldehyde. | Dil. HCl; formic acid. |
| Onium | $NH_3^+$ |  | Base. |
| Urethane | HN.CO.OCH₂CCl₃ | β,β,β-Trichloroethoxycarbonyl | Reducing agents, e.g. Zn/acetic acid. |

Subsequent reactions

Where the resultant compound contains a sulphinyl group at the 1-position this may be reduced by any convenient means. This may, for example, be effected by reduction of the corresponding acyloxysulphonium or alkyloxysulphonium salt prepared in situ by reaction with e.g. acetyl chloride in the case of an acetoxysulphonium salt, reduction being effected by, for example, sodium dithionite or by iodide ion as in a solution of potassium iodide in a water miscible solvent e.g. acetic acid tetrahydrofuran, dioxan, dimethylformamide or dimethylacetamide. The reaction may be effected at a temperature of −20° to +50° C.

Alternatively, reduction of the 1-sulphinyl group may be effected by phosphorus trichloride or tribromide in solvents such as methylene chloride, dimethylformamide or tetrahydrofuran, preferably at a temperature of −20° C. to +50° C.

Where the resultant compound is a ceph-2-em compound, the desired ceph-3-em compound may be obtained by treatment of the former with a base e.g. a base of the type used in the preparation of the phosphoranylidene compounds.

Removal of any groups protecting any amino or carboxyl groups may be effected as desired above.

Administration

The compounds according to the invention may be formulated for administration in any convenient way, by analogy with other antibiotics and the invention therefore includes withi its scope a pharmaceutical composition comprising a compound of Formula I or a non-toxic derivative e.g. salt thereof (as herein defined) adapted for use in human or veterinary medicine. Such compositions may be presented for use in conventional manner with the aid of any necessary pharmaceutical carriers or excipients.

The compositions are preferably presented in a form suitable for absorption by the gastro-intestinal tract. Tablets and capsules for oral administration may be in unit dose presentation form, and may contain conventional excipients such as binding agents, for example, syrup, acacia, gelatin, sorbitol, tragacanth, or polyvinylpyrrolidone; fillers, for example, lactose, sugar, maize-starch, calcium phosphate, sorbitol or glycine; lubricants, for example, magnesium stearate, talc, polyethylene glycol, silica; disintegrants, for example, potato starch or acceptable wetting agents such as sodium lauryl sulphate. The tablets may be coated according to methods well known in the art. Oral liquid preparations may be in the form of aqueous or oily suspension, solution, emulsions, syrups, elixirs, etc. or may be presented as a dry product, for reconstitution with water or other suitable vehicle before use. Such liquid preparations may contain conventional additives such as suspending agents, for example, sorbitol syrup, methyl cellulose, glucose/sugar syrup, gelatin hydroxyethylcellulose, carboxymethyl cellulose, aluminium stearate gel or hydrogenated edible fats; emulsifying agents, for example, lecithin, sorbitan mono-oleate or acacia; non-aqueous vehicles which may include edible oils, for example, almond oil, fractionated coconut oil, oily esters, propylene glycol, or ethyl alcohol; preservatives, for example, methyl or propyl p-hydroxybenzoates or sorbic acid. Suppositories will contain conventional suppository bases, e.g. cocoa butter or other glyceride.

Compositions for injection may be presented in unit dose form in ampoules, or in multidose containers with an added preservative. The compositions may take such forms as suspensions, solutions, emulsions in oily or aqueous vehicles, and may contain formulatory agents such as suspending, stabilising and/or dispersing agents. Alternatively the active ingredient may be in powder form for reconstitution with a suitable vehicle, e.g. sterile, pyrogen-free water, before use.

The compositions may also be prepared in suitable forms for absorption through the mucous membranes of the nose and throat or bronchial tissues and may conveniently take the form of powder or liquid sprays or inhalants, lozenges, throat paints etc. For medication of the eyes or ears, the preparations may be presented as individual capsules, in liquid or semi-solid form, or may be used as drops etc. Topical applications may be formulated in hydrophobic or hydrophilic bases as ointments, creams, lotions, paints, powders etc.

For veterinary medicine the composition may, for example, be formulated as an intramammary preparation in either long acting or quick-release bases.

The compositions may contain from 0.1% upwards, e.g. 10–99%, preferably from 10–60% of the active material, depending on the method of administration. Where the compositions comprise dosage units, each unit will preferably contain 50–500 mg. of the active ingredient. The dosage as employed for adult human treatment will preferably range from 100–300 mg. for instance 1500 mg. per day, depending on the route and frequency of administration.

The compounds according to the invention may be administered in combination with other therapeutic agents such as antibiotics, for example, other cephalosporins, the penicillins or tetracyclines.

In order that the invention may be well understood the following examples are given by way of illustration only.

In the examples, unless otherwise stated (1) Ultra-violet (UV) spectra were measured on solutions in ethanol.

(2) Infra-red (IR) spectra were measured on mulls in Nujol.

(3) Optical rotations were determined at 19 to 30° at concentrations in the range 0.5 to 1.5% as solutions in dimethylsulphoxide. Where other solvents were used the same concentration range applied.

(4) Solutions were dried over anhydrous magnesium sulphate.

(5) All grades of Kieselgel were supplied by Merck AG, Darmstadt, Germany.

(6) Proton magnetic resonance (PMR) spectra were determined at 60 or 100 mHz. The signs of the coupling constants (J) are not assigned. Signals are assigned as singlets (s) doublets (d), double doublets (dd), triplets (t), quartets (q), double quartets (dq), AB-quartets (AB-q), quintets (qu) and multiplets (m)

System A is descending n-propanol:water=7:3, on Whatman No. 1 paper at room temperature.

System B is n-butanol:ethanol:water=4:1:5, equilibrated at room temperature, the upper phase being used as developer in descending manner, in equilibrium with lower phase, on Whatman 3MM paper buffered to pH 6 with 0.05 M sodium dihydrogen phosphate.

System C is ethyl acetate:n-butanol:0.1 M-sodium acetate pH 5=8:1:8, equilibrated at 38° C., the upper phase being used as developer in descending manner, in equilibrium with lower phase at 38°, on No. 1 Whatman paper buffered to pH 5 with 0.1 M sodium acetate.

Light petroleum was the fraction, B.P. 40 to 60°. Methylene chloride was dried on Woelm Grade I basic alumina. Thin-layer chromatography was carried out upwards on Merck silica plates developed with benzene:ethyl acetate=4:1, or in these conditions.

System D Merck $GF_{254+366}$ plates, with the upper phase of Solvent Mixture B for development.

System E. On the plates of System D, with benzene:ethyl acetate=5:1 for development. Unless otherwise stated $R_F$ values are using System E.

System F. As System E, but with benzene:ethyl acetate=1:1 as solvent.

These abbreviations are used for the appearances of the spots: s., strong; m., medium; f., faint; v., very.

As far as possible, analytical values for solvates were confirmed by the inspection for the appropriate features in the spectra.

$R_P$ represents the $R_F$ value divided by that of 3-acetoxymethyl-7β-(phenylacetamido) ceph - 3 - em-4-carboxylic acid.

$R_T$ represents the $R_F$ value divided by that of 3-acetoxymethyl - 7β - (2-thienylacetamido)ceph-3-em-4-carboxylic acid.

The conditions for electrophoresis are those described by Cocker et al., J. Chem. Soc. 1965, 5015.

EXAMPLE 1

(a) Diphenylmethyl 3 - formyl - 7β-(2-thienylacetamido) ceph-3-em-4-carboxylate

Diphenylmethyl 3-hydroxymethyl-7β-(2-thienylacetamido)ceph-3-em-4-carboxylate (520 mg.; 1 mmole) was dissolved at 0° in acetone [30 ml., purified by distillation from Jones reagent J. Chem. Soc., 1946, 39)]. Jones reagent (0.30 ml.; 1.1 mmole; 8 N–$CrO_3$ in ca. 25% sulphuric acid) was added during 2 minutes and the mixture stirred for a further 3 minutes before being poured into water (100 ml.) an ethyl acetate (100 ml.). The product was extracted into ethyl acetate. Drying and evaporation gave a gum which solidified (0.32 g.) on trituration with ether; the ether solution gave a further amount of solid (0.13 g.) on evaporation. Thin-layer chromatography showed these crops to be identical.

A sample crystallised from ethanol in fine needles M.P. 162–164° [α]$_D$ —1.12° (dioxan); λλ$_{max.}$ 231 nm. (ε 13,200), 293–5 nm. (ε 10,400) $ν_{max.}$ ($CHBr_3$) 1675 cm.$^{-1}$ (—CHO), τ ($CDCl_3$) 0.40 (1-proton s, C$\underline{H}$O), 3.50 (1-proton d, J 9 Hz. 1 NH), 4.08 (1-proton dd, J 5 and 9 Hz. $C_7$—H), 5.03 (1-proton d, J 5 Hz.; $C_6$—H), 6.20 (2-proton s; $C\underline{H}_2$ CONH), 6.04 and 6.81 (AB q, J 18 Hz.; $C_{(2)}CH_2$). Found: C, 62.4; H, 4.5; N, 4.9. $C_{27}H_{22}N_2O_5S_2$ requires C, 62.6; H, 4.3; N, 5.3%). $R_F$ 0.95 (Kieselgel G, ethyl acetate-benzene—2:1), 0.6 (Kieselgel G, ethyl acetate-benzene—1:4).

(b) Diphenylmethyl 3-(trans-2-ethoxycarbonylvinyl)-7β-(2-thienylacetamido)ceph-3-em-4-carboxylate A solution of ethoxycarbonylmethylenetriphenylphosphorane (4.86 g., 13.9 mmole) in dry methylene chloride (45 ml.) was added slowly (over ca. 20 minutes) to a solution of diphenylmethyl 3-formyl-7β-(2-thienylacetamido)ceph-3-em-4-carboxylate (7.2 g., 13.9 mmoles). After 40 minutes at room temperature, the solution was washed with N-hydrochloric acid (40 ml.) and water, and dried and evaporated in vacuo. The residue, in benzene:ethyl acetate (8:1), was chromatographed on Kieselgel (0.02–0.5 mm., 500 g.). Fractions containing material with similar mobilities on T.L.C. ($R_F$ ca. 0.7) were combined and evaporated in vacuo. The residue was dissolved in ethyl acetate and the solution run into petroleum ether to give the trans-vinyl compound (1.71 g., 21%) as an amorphous solid. A portion (200 mg.) of this material was crystallised from methanol to give a pure sample (142 mg.) as fine needles, M.P. 162–3° [α]$_D$ —192.6° ($CHCl_3$), λ$_{max.}$ 319 nm. (ε 22,100), $ν_{max.}$ ($CHBr_3$) 3400 (NH), 1782 (β-lactam), 1720 (4—$CO_2R$), 1700 (CH=$CHCO_2R$), 1690 and 1520 cm.$^{-1}$ (CONH), τ ($CDCl_3$) 3.52 (NH, d, J 9 Hz.); 4.04 and 2.15 (CH=CH, two d, J 16 Hz.), 4.15 ($C_{(7)}$—H, dd, J 4.5, 9 Hz.), 5.06 ($C_{(6)}$—H, d, J 4.5 Hz.). 5.83 and 8.76 (—O$CH_2CH_3$; q and t, J 7 Hz.), 6.20 (—$C\underline{H}_2$CONH, s) and 6.48 and 6.69 ($C_{(2)}$—$CH_2$, AB—q (nearly collapsed to a s), J 18 Hz.). (Found: C, 63.3; H, 4.8; N, 4.45; S, 10.7. $C_{31}H_{28}N_2O_6S_2$ requires C, 63.25; H, 4.8; N, 4.75. S, 10.9%.)

(c) 3 - (trans-2-ethoxycarbonylvinyl)-7β-(2-thienylacetamido)ceph-3-em-4-carboxylate Diphenylmethyl 3-(trans-2-ethoxycarbonylvinyl)-7β-(2-thienylacetamido)ceph-3-em-4-carboxylate (1.02 g.) was treated with anisole (1 ml.) and trifluoroacetic acid (4 ml.). After 4 minutes at room temperature the solvents were removed in vacuo. The residue was dissolved in ethyl acetate and the solution extracted with saturated sodium bicarbonate solution containing an equal volume of water. The alkaline solution was taken to pH 7 with N-hydrochloric acid and traces of organic solvent evaporated in vacuo. The aqueous solution was taken to pH 2 with N-hydrochloric acid and the precipitated solid collected by filtration and washed with water and dried to give the acid (600 mg., 82%). This material was crystallised from ethyl acetate-petroleum ether to give a purer sample (435 mg.) as fine needles, M.P. 245° (decomp.) [α]$_D$ —56.5° (MeOH, λ$_{max.}$ 227 nm. (ε 12,850) and 320 nm. (ε 24,500); λ$_{max.}$ (0.1 M—pH 6 phosphate buffer) 232 nm. (ε 12,160) and 318 nm. (ε 25,220), $ν_{max.}$ 3280 (NH), 1780 (β-lactam), 1728 ($CO_2R$) 1690 ($CO_2H$), 1660 and 1530 cm.$^{-1}$ (CONH), τ ($CDCl_3$ containing 1 drop dimethylsulphoxide) 2.2 (NH, d, J 9 Hz.), 2.08 and 4.02 (—CH=CH—, two d, J 16 Hz.), 4.19 ($C_{(7)}$—H, dd, J 9 and 4.5 Hz.), 5.0 ($C_{(6)}$—H, d, J 4.5 Hz.), 6.18 (C$\underline{H}_2$CONH, s) and 6.47 ($C_{(2)}$—$CH_2$, s), $R_F$ 0.52 (System B) and 0.64 (System C). (Found: C, 51.3; H, 4.3; N, 6.4; S, 15.2. $C_{18}H_{18}N_2O_6S_2$ requires C, 51.2; H, 4.3; N, 6.6; S, 15.2%.)

EXAMPLE 2

(a) Diphenylmethyl 3-(trans-2-diphenylmethoxycarbonylvinyl)-7β-(2-thienylacetamido)ceph-3-em-4-carboxylate A solution of diphenylmethoxycarbonylmethylenetriphenylphosphorane (4.0 g., 8.24 mmoles) in dry methylene chloride (45 ml.) at —20° was added slowly (over ca. 20 minutes) to a solution of diphenylmethyl 3-formyl- 7β-(2-thienylacetamido)ceph-3-em-4-carboxylate (4.28 g., 8.26 mmoles) at −20°. After 1 hour at −20° the solution was washed with N-hydrochloric acid (50 ml.) and water, and dried and evaporated in vacuo. The residue, in benzene-ethyl acetate (8:1), was chromatographed on Kieselgel (0.02–0.5 mm., 300 g.). Fractions containing material with similar mobilities on T.L.C. ($R_F$ ca. 0.7) were combined and evaporated in vacuo. A solution of the residue in ethyl acetate was run into petroleum ether to give the trans-vinyl compound (1.68 g., 28%) as an amorphous solid, M.P. ca. 94° $[α]_D$ −153.5° ($CHCl_3$), $λ_{max.}$ 321 nm. (ε 20,650), $ν_{max.}$ 3300 (NH), 1780 (β-lactam), 1715 (C=C—$CO_2R$) and 1680 cm.$^{-1}$ (CONH), τ ($CDCl_3$) 3.61 (NH, d, J 9 Hz.), 2.02 and 3.9 (CH=CH, two d, J 16 Hz.), 4.18 ($C_{(7)}$—H, dd, J 4.5 and 9 Hz.), 5.06 ($C_{(6)}$—H, d, J 4.5 Hz.), 6.2 ($CH_2$CONH, s), and 6.51 ($C_{(2)}$—$CH_2$, s). (Found: C, 68.5; H, 4.7; N, 3.7; S, 8.5. $C_{42}H_{34}N_2O_6S_2$ requires C, 69.4; H, 4.7; N, 3.85; S, 8.8%.)

(b) 3 - (trans - 2-carboxyvinyl)-7β-(2-thienylacetamido) ceph-3-em-4-carboxylic acid Diphenylmethyl 3 - (trans-2-diphenylmethoxycarbonylvinyl) - 7β - (2-thienylacetamido)ceph-3-em-4-carboxylate (1.63 g.) was treated with anisole (3.4 ml.) and trifluoroacetic acid (12.8 ml.). After 4 minutes at room temperature the solvents were removed in vacuo. The residue was dissolved in ethyl acetate and the solution extracted with saturated sodium bicarbonate containing an equal volume of water. Traces of ethyl acetate were removed from the alkaline solution in vacuo and it was taken to pH 1 with concentrated hydrochloric acid. The precipitated solid was collected by filtration and washed with water, dried and crystallised from ethyl acetate to give the acid (470 mg.) as fine needles, M.P. 146–149° (decomp), $[α]_D$ +18.4° (1%—$NaHCO_3$), $λ_{max.}$ (0.1 M—pH 6 phosphate buffer) 234 nm. (ε 7,965) and 308 nm. (ε 20,900), $ν_{max.}$ 3270 (NH), 1780 (β-lactam), 1714 and 2750 (—$CO_2H$), and 1644 and 1540 (CONH), τ ($D_2O$—$NaHCO_3$) 2.70 and 3.98 (CH=CH, two d, J 16 Hz.), 4.39 ($C_{(7)}$—H, d, J 4.5 Hz.), 4.39 ($C_{(6)}$—H, d, J 4.5 Hz.), 6.11 ($CH_2$CONH, s), 6.39 ($C_{(2)}$—$CH_2$, s) and 7.94 and 8.77 (0.6 mole ethyl acetate), $R_F$ 0.14 (System B) and 0.05 (System C). (Found: C, 48.4; H, 4.1; N, 5.7; S, 13.3. $C_{16}H_{14}N_2O_5S_2$ (0.6 $CH_3CO_2C_2H_5$) requires C, 49.4; H, 4.25; N, 6.25; S, 14.3%.)

EXAMPLE 3

(a) Diphenylmethyl 3-(cis-2-cyanovinyl)-7β-(2-thienylacetamido)ceph-3-em-4-carboxylate A solution of cyanomethylenetriphenylphosphorane (3.77 g., 12.5 mmoles) in dry methylene chloride (45 ml.) at −20° was added slowly (over ca. 20 minutes) to a solution of diphenylmethyl 3-formyl-7β-(2-thienylacetamido)ceph-3-em-4-carboxylate (6.48 g., 12.5 mmoles) at −20°. After 40 minutes at −20° the solution was washed with N-hydrochloric acid (45 ml.) and water, and dried and evaporated in vacuo. The residue, in benzene-ethyl acetate (8:1), was chromatographed on Kieselgel (0.02–0.5 mm., 380 g.). Fractions containing material with similar mobilities on T.L.C. ($R_F$ ca. 0.6) were combined and evaporated in vacuo. The residue (2.76 g., 40%) was crystallised from acetone-light petroleum to give the cis-vinyl compound (2.26 g., 33%) as fine needles, M.P. 171.5–172.5° (decomp.), $[α]_D$ −258° ($CHCl_3$), $λ_{max.}$ 318 nm. (ε 17,700), $ν_{max.}$ ($CHBr_3$) 3415 (NH), 2230 (C≡N), 1796 (β-lactam), 1728 ($CO_2R$) and 1690 and 1512 cm.$^{-1}$ (CONH), τ ($CDCl_3$) 2.9 and 4.8 (CH=CH, two d, J 12 Hz.), 3.44 (NH, d, J 9 Hz.), 4.1 ($C_{(7)}$—H, dd, J 4.5 and 9 Hz.), 5.02 ($C_{(6)}$—H, d, J 9 Hz.), 5.89 and 6.29 ($C_{(2)}$—$CH_2$, AB—q, J 18 Hz.), 6.19 ($CH_2$CONH, s). (Found: C, 64.2; H, 4.4; N, 7.5; S, 11.5. $C_{29}H_{23}N_3O_4S_2$ requires C, 64.3; H, 4.3; N, 7.75; S, 11.85%.)

(b) 3 - (cis-2-cyanovinyl)-7β-(2-thienylacetamido)ceph-3-em-4-carboxylic acid

Diphenylmethyl 3-(cis-2-cyanovinyl)-7β-(2-thienylacetamido)ceph-3-em-4-carboxylate (1 g.) was treated with anisole (1 ml.) and trifluoroacetic acid (4 ml.). After 4 minutes at room temperature the solvents were removed in vacuo. The residue was dissolved in ethyl acetate and the solution extracted with saturated sodium bicarbonate solution containing an equal volume of water. Traces of ethyl acetate were removed from the alkaline solution in vacuo, which was taken in pH 2 with N-hydrochloric acid. The precipitated solid was collected by filtration and washed with water, and dried and crystallised from ethyl acetate-light petroleum to give the acid (370 mg., 53%) as needles, M.P. 157–158° (decomp.), $[α]_D$ −127° (c. 0.9, 1%—$NaHCO_3$), $λ_{max.}$ (0.1 M—pH 6 phosphate buffer) 233 nm. (ε 11,450) and 317 nm. (ε 22,860, $ν_{max.}$ 3310 (NH), 2218 (C≡N), 1775 (β-lactam), 1713 and 2600 ($CO_2H$), and 1620 and 1540 cm.$^{-1}$ (CONH), τ ($D_2O$—$NaHCO_3$) 2.92 and 4.59 (CH=CH, two d, J 13), 4.36 ($C_{(7)}$—H, dd, J 4.5 and 9 Hz.), 4.89 ($C_{(6)}$—H, d, J 4.5 Hz.), 5.94 and 6.2 ($C_{(2)}$—$CH_2$; AB—q, J 17 Hz.), and 6.12 ($CH_2$CONH, s). (Found: C, 50.9; H, 3.6; N, 11.4; S, 16.95. $C_{16}H_{13}N_3O_4S$ requires C, 51.2; H, 3.5; N, 11.2; S, 17.1%.) $R_F$ 0.45 (System C).

EXAMPLE 4

(a) Diphenylmethyl 3 - (trans-2-cyanovinyl)-7β-(2-thienylacetamido)ceph-3-em-4-carboxylate Fractions from the column described in Example B 3(a) with $R_F$ ca. 0.5 on T.L.C. were combined and evaporated in vacuo. The residue was crystallised from acetone-light petroleum to give the trans- vinyl compound (410 mg., 6%) as needles, M.P. 174–175° (decomp.), $[α]_D$ −203° ($CHCl_3$), $λ_{max.}$ ($CHCl_3$) 321 nm. (ε 22,070), $ν_{max.}$ ($CHBr_3$) 3350 (NH), 2210 (C≡N), 1778 (β-lactam), 1713 ($CO_2R$), and 1675 and 1500 cm.$^{-1}$ (CONH), τ ($CDCl_3$) 1.82 (NH, d, J 9 Hz.), 2.60 and 4.52 (CH=CH, two d, J 16 Hz.), 4.16 ($C_{(7)}$—H, dd, J 4.5 and 9 Hz.), 5.0 ($C_{(6)}$—H, d, J 4.5 Hz.), 6.2 ($CH_2$CONH, s) and 6.58 ($C_{(2)}$—$CH_2$, s). Found: C, 63.9; H, 4.2; N, 7.1; S, 11.75. $C_{29}H_{23}N_3O_4S_2$ requires C, 64.3; N, 4.3; N, 7.75; S, 11.85%.

(b) 3-(trans-2-cyanovinyl)-7β-(2-thienylacetamido)ceph-3-em-4-carboxylic acid

Diphenylmethyl 3 - trans-2-cyanovinyl)-7β-(2-thienylacetamido)ceph-3-em-4-carboxylate (340 mg.) was treated with anisole (0.4 ml.) and trifluoroacetic acid (1.6 ml.). After 4 minutes at room temperature the solvents were removed in vacuo. The residue was triturated with ether to give the acid (203 mg., 86%) as an amorphous solid. This material was dissolved in ethyl acetate and the solution run into petroleum ether to give a purer sample (185 mg.) as an amorphous solid, M.P. 158 to 166° (decomp.), $[α]_D$ −21.6° (1%—$NaHCO_3$), $λ_{max.}$ (0.1 M—pH 6 phosphate buffer) 232 nm. (ε 17,680) and 317 nm. (ε 27,450), $ν_{max.}$ ($CHBr_3$) 3540 (broad, $H_2O$), 3400 (NH), 2260 (C≡N), 1790 (β-lactam), 1730 ($CO_2H$), and 1690 and 1520 (CONH), τ ($D_2O$, with $NaHCO_3$) 2.54 and 4.43 (CH=CH, two d, J 17 Hz.), 4.36 ($C_{(7)}$—H, d, J 4.5 Hz.), 4.86 ($C_{(6)}$—H, d, J 4.5 Hz.), 6.14 ($CH_2$CONH, s), and 6.50 ($C_{(2)}$—$CH_2$, s), $R_F$ 0.57 (System B) and 0.25 (System C). (Found: C, 48.8; H, 3.6; N, 10.6; S, 16.1. $C_{16}H_{13}N_3O_4S_2$·1 $H_2O$ requires C, 48.8; H, 3.85; N, 10.7; S, 16.3%.)

EXAMPLE 5

(a) 7β-(D-2-t-butoxycarbonylamino-2-phenylacetamido)-3-hydroxymethylceph-3-em-4-carboxylic acid A suspension of 3-acetoxymethyl-7β-(D-2-t-butoxycarbonylamino - 2 - phenylacetamido)ceph-3-em-4-carboxylic acid (50 g.) in water (2 l.) was treated with defatted wheat germ (250 g.) and the pH of the mixture adjusted to ca. 6.8 with 2 N-sodium hydroxide. The mixture was stirred at 37° for 24 hours and the pH kept at 6.5–6.9 by the addition of further amounts of 2 N-sodium hydroxide. [A total of 10 ml. (ca. 2 equivalents) of sodium hydroxide was used.] Paper chromatography (System C) indicated that hydrolysis was complete after this period. The mixture was poured into acetone (ca. 3 l.) and treated with kieselguhr; insoluble material was removed by filtration. The filtercake was washed with aqueous acetone and acetone removed from the combined filtrates in vacuo. The aqueous solution was extracted with ethyl acetate (2× ca. 500 ml.), cooled to 5°, and the pH adjusted to 2.5 with orthophosphoric acid. The mixture was extracted with ethyl acetate an the extracts dried and evaporated to low volume in vacuo (i.e. until crystallisation started). Filtration gave 7β-(D-2-t-butoxycarbonylamino-2-phenylacetamido) - 3-hydroxymethylceph-3-em-4-carboxylic acid (23 g.) as small needles, M.P. 187°, $[\alpha]_D$ +21° (dioxan), $\lambda_{max.}$ (0.1 M—pH 6 phosphate buffer) 258 nm. ($\epsilon$ 7,000), $\nu_{max.}$ 1766 (β-lactam), 1715 ($CO_2R$), 1680 ($CO_2H$), and 1655 and 1515 cm.$^{-1}$ (—CONH—), $\tau$ ($CDCl_3$ 2.65 (pH), ca. 4.55 ($C_{(7)}$—H, ill-resolved 1-proton m), ca. 5.1 ($C_{(6)}$—H and $CH[NHCO_2C(CH_3)_3]$, ill-resolved 2-proton complex), 5.86 ($\overline{CH}[NHCO_2C(CH_3)_3]$, d, J 6 Hz.), 8.6 ($C(CH_3)_3$). (Found: C, 54.7; H, 5.8; N, 8.9; S, 6.0. $C_{21}H_{25}N_3O_7S$ requires C, 54.4; H, 5.4; N, 9.0; S, 6.9%.) $R_F$ 0.44 (System C).

(b) Diphenylmethyl 7β - (D-2-t-butoxycarbonylamino-2-phenylacetamido) - 3 - hydroxymethylceph - 3-em-4-carboxylate The total crude product from the hydrolysis of 3-acetoxymethyl - 7β - (D - 2-t-butoxycarbonylamino-2-phenylacetamido)ceph-3-em-4-carboxylic acid (9 g.), with wheat germ (90 g.) (see Example 5(a)) was dissolved in tetrahydrofuran (150 ml.) and treated with an excess of diphenyldiazomethane in petroleum ether (B.P. 40 to 60°) at 22° overnight. A few drops of acetic acid were added to the solution, which was evaporated in vacuo. The resulting foam was dissolved in ethyl acetate and the solution run into petroleum ether (B.P. 40 to 60°) to give the ester as an amorphous solid (10.3 g., 92%), $\lambda_{max.}$ (dioxan) 265 nm. ($\epsilon$ 5,540), $\nu_{max.}$ ($CHBr_3$) 3550 (OH), 3400 (NH), 1780 (β-lactam), 1710 ($CO_2R$) and 1690 and 1510 cm.$^{-1}$ (—COHN—). A portion (1 g.) of this material was crystallised from ethanol to give a purer sample (426 mg.) as fine needles, M.P. 151–2°, $[\alpha]_D$ —20.8° (dioxan), $\lambda_{max.}$ (dioxan) 264 nm. ($\epsilon$ 7,152), $\nu_{max.}$ ($CHBr_3$) 3670 ($H_2O$), 3550 (OH), 3400 (NH), 1780 (β-lactam), 1710 ($CO_2R$) and 1690 and 1510 cm.$^{-1}$ (—CONH—), $\tau$ ($CDCl_3$) 2.74 (Ph), 3.12 ($CHPh_2$), ca. 4.15 ($C_{(7)}$—H, part of a dd, J 4.5), 4.28 ($\overline{CH}[NHCO_2C(CH_3)_3]$, d, J 6 Hz.), 4.8

$(C\underline{H}[NHCO_2C(CH_3)_3]$, d, J 6 Hz.), 5.2 ($C_{(6)}$—H, d, J 4.5 Hz.), 5.61 and 6.1 (—$CH_2OH$, AB—q, J 12.5 Hz.), 6.65 ($C_{(2)}$—$CH_2$) and 8.62 $\overline{C(CH_3)_3}$. (Found: C, 64.0; H, 5.7; N, 6.3; S, 5.0. $C_{34}H_{35}N_3O_7S$, 0.5 $H_2O$ requires C, 63.9; H, 5.7; N, 6.6; S, 5.0%).

(c) Diphenylmethyl 3 - formyl-7β(D-2-t-butoxycarbonylamino-2-phenylacetamido)ceph-3-em-4-carboxylate A solution of diphenylmethyl) 7β-(D-2-t-butoxycarbonyl amino-2-phenylacetamido-3-hydroxymethyl ceph-3-em-4-carboxylate (11.1 g.) in acetone (250 ml.; purified by distillation from Jones' reagent) was treated with Jones' reagent (4.9 ml., 1.1 equivalents) at 22°. The mixture was stirred vigorously for five minutes, then poured into saturated brine (500 ml.) and ethyl acetate (500 ml.). The aqueous phase was extracted with ethyl acetate and the combined extracts washed with brine, and dried and evaporated in vacuo. The residue was crystallised from benzene to give the 3-formyl derivative (3.5 g., 32%) as fine needles, M.P. 183–185°, $[\alpha]_D$ —152.7° (tetrahydrofuran), —174° (c. 0.9, $CHCl_3$), $\lambda_{max.}$ 295 nm. ($\epsilon$ 11,150), $\nu_{max.}$ ($CHBr_3$) 3440 (NH), 1800 (β-lactam), 1728 ($CO_2R$), 1700 and 1500 ($NHCO_2R$), 1692 (CHO), 1674 and 1500 (CONH), and 760 cm.$^{-1}$ (phenyl) $\tau$ ($CDCl_3$) 0.42 (C$\underline{H}$O), 2.69 (phenyl), 2.94 (C$\underline{H}Ph_2$), ca. 3.0 (CONH), 4.1 ($C_{(7)}$—H, dd, J 4.9 and 9 Hz.), 4.4 (C$\underline{H}$NH, d, J 7 Hz.), 4.8 (CHN$\underline{H}$, d, J 7 Hz.), 5.1 ($C_{(6)}$—H, d, J 4.5 Hz.), 6.14 and 6.89 ($C_{(2)}$—$CH_2$, AB—q, J 18 Hz.) and 8.61 ($C(CH_3)_3$). (Found: C, 65.7; H, 5.65; N, 6.65; S, 5.2. $C_{34}H_{33}N_3O_7S$ requires C, 65.1; H, 5.3; N, 5.1%).

The filtrate from the above crystallisation was run into petroleum ether (B.P. 40 to 60°) to give a further amount (5.22 g., 47%) of usable aldehyde, $\lambda_{max.}$ 294 nm. ($\epsilon$ 9,000), with an infrared spectrum identical of that of the crystalline sample.

(d) Diphenylmethyl 3 - (trans-2-ethoxycarbonylvinyl)-7β - (D-2-t-butoxycarbonylamino-2-phenylacetamido) ceph-3-em-4-carboxylate A solution of ethoxycarbonylmethylenetriphenylphosphorane (3.83 g.) in dry methylene chloride (45 ml.) at —20° was added slowly (over ca. 20 minutes) to a solution of diphenylmethyl 3-formyl-7β-(D-2-t-butoxycarbonylamino - 2 - phenylacetamido)ceph - 3 - em-4-carboxylate (6.92 g.) in methylene chloride (45 ml.) at —20°. After 1½ hours at —20° the solution was washed with N-hydrochloric acid (100 ml.) and water and dried and evaporated in vacuo. The residue (10 g.), in benzene: ethyl acetate (8:1) was chromatographed on Kieselgel (0.02–0.5 mm., 400 g.). Fractions containing material with similar mobilities on T.L.C. ($R_F$ ca. 0.7) were combined and evaporated in vacuo. The residue was dissolved in ethyl acetate and the solution run into petroleum ether to give the trans vinyl compound (850 mg.) as an amorphous solid, M.P. ca. 105°, $[\alpha]_D$ —144.6° ($CHCl_3$), $\lambda_{max.}$ 2318 nm. ($\epsilon$ 18,300), $\nu_{max.}$ ($CHBr_3$) 3400 (NH), 1780 (β-lactam) and 1700 cm.$^{-1}$ (broad, $CO_2R$), $\tau$ ($CDCl_3$) 2.2 and 4.11 (CH=CH, two d, J 16 Hz.), 3.12 $C_{(7)}$—N$\underline{H}$—CO, d, J 9 Hz.), 4.20 ($C_{(7)}$—H, dd, J 4.5 and 9 Hz.), 4.36 (CH[N$\underline{H}$COOC($CH_3)_3]$, d, J 6 Hz.), 4.81 (C$\underline{H}$[NHCOOC($CH_3)_3]$, d, J 6 Hz.), 5.17 ($C_{(6)}$—H, d, J 4.5 Hz.), 5.85 and 8.79 ($CO_2C_2H_5$, q and t, J 7 Hz.), 8.61 ($C(CH_3)_3$, s). Found: C, 64.7; H, 5.65; N, 6.05; S, 4.7. $C_{38}H_{39}N_3O_8S$ requires C, 65.4; H, 5.6; N, 6.0; S, 4.7%.)

(e) 7β - (D - 2 - aminophenylacetamido) - 3-trans-2-ethoxycarbonylvinyl) - ceph - 3 - em - 4 - carboxylic acid, trifluoroacetic acid salt Diphenylmethyl 3 - (trans-2-ethoxycarbonylvinyl)-7β-(D - 2 - t - butoxycarbonylamino-2-phenylacetamido) ceph-3-em-4-carboxylate (900 mg.) was treated with anisole (0.9 ml.) and trifluoroacetic acid (3.6 ml.). After 5 minutes at room temperature the solvents were removed in vacuo and the residue partitioned between ethyl acetate and water containing trifluoroacetic acid (0.1 ml.). The aqueous solution was washed thoroughly with ethyl acetate, then freeze-dried to give the amine salt (470 mg.) as an amorphous solid, M.P. 142–145° (decomp), $[\alpha]_D$ —80.8° (tetrahydrofuran), $\lambda_{max.}$ 320 nm. ($\epsilon$ 17,800), $\nu_{max.}$ ca. 2600 ($CO_2H$), 1700 (β-lactam) and 1680 cm.$^{-1}$ (C=C, $CO_2R$ and $CF_3CO_2^-$), $\tau$ (DMSO—$d_6$) 0.41 ($C_{(7)}$—N$\underline{H}$CO, d, J 9 Hz.), 2.33 and 3.86 (CH=CH, two d, J 16 Hz.), 4.2 ($C_{(7)}$—H, dd, J 4.5 and 9 Hz.), 4.91 ($C_{(6)}$—H, d, J 4.5 Hz.), 5.00

$(CH-\overset{+}{N}\underline{H}_3, s)$ 5.89 and 8.81

($CO_2C_2H_5$, q and t, J 7 Hz.), and 6.19 and 6.57 ($C_{(2)}$—$CH_2$, AB—q, J 18 Hz.), $R_F$ 0.5 (System C). (Found: C, 46.85; H, 4.15; F, 10.9; N, 7.75; S, 6.0. $C_{22}H_{22}F_3N_3O_8S \cdot H_2O$ requires C, 46.9; H, 4.3; F, 10.5; N, 7.5; S, 5.7%.)

EXAMPLE 6

(a) Diphenylmethyl 3 - (trans - 2 - diphenylmethoxycarbonylvinyl) - 7β - (D - 2 - t-butoxycarbonylamino-2-phenylacetamido)ceph-3-em-4-carboxylate A solution of diphenylmethoxycarbonylmethylenetriphenylphosphorane (4.05 g., 8.3 mmole) in dry methylene chloride (45 ml.) at −20° was added slowly (over ca. 30 minutes) to a solution of diphenylmethyl 7β-(D-2-t-butoxycarbonylamino - 2 - phenylacetamido)-3-formylceph-3-em-4-carboxylate (5.2 g., 8.3 mmole) in methylene chloride (45 ml.) at −20°. After 1 hour at −20° the solution was washed with N-hydrochloric acid (45 ml.) and water, and dried and evaporated in vacuo. The residue (9.6 g.), in benze-ethyl acetate (8:1) was chromatographed on Kieselgel (0.02–0.5 mm., 350 g.). Fractions containing material with similar mobilities on T.L.C. ($R_F$ ca. 0.6) were combined and evaporated in vacuo. The residue was crystallised from acetone-methanol to give the trans- vinyl compound (600 mg.) as needles, M.P. 156–158°, $[\alpha]_D$ −163° ($CHCl_3$), $\lambda_{max}$. 321 nm. ($\epsilon$ 23,100), $\nu_{max}$. ($CHBr_3$) 3370 (NH), 1780 (β-lactam), 1710 ($CO_2R$), and 1690 and 1498 cm.$^{-1}$ (CONH), τ ($CDCl_3$) 2.07 and 3.97 (CH=CH, two d, J, 16 Hz.), 3.15 ($C_{(7)}$—N$\underline{H}$CO, d, J 9 Hz.), 4.22 ($C_{(7)}$—H, dd, J 4.5 and 9 Hz.), 4.42 (CHN$\underline{H}$ COOC($CH_3$)$_3$, d, J 6 Hz.), 4.83 [CHNHCOOC($CH_3$)$_3$, d, J 6 Hz.] 5.24 ($C_{(6)}$—H, d, J 4.5 Hz.), 6.54 and 6.74 ($C_{(3)}$—$CH_2$, AB—q, J 18 Hz.), 8.6 (C($CH_3$)$_3$, s). (Found: C, 69.5; H, 5.4; N, 5.1; S, 3.9. $C_{49}H_{45}N_3O_8S$ requires C, 70.5; H, 5.4; N, 5.0; S, 3.8%.)

(b) 7β - (D - 2 - aminophenylacetamido)-3-(trans-2-carboxyviny)ceph - 3 - em - 4 - carboxylic acid, trifluoroacetic salt Diphenylmethyl 3-(trans-2-diphenylmethoxy carboxylvinyl) - 7β - (D-2-t-butoxycarbonylamino-2-phenylacetamido)ceph-3-em-4-carboxylate (685 mg.) was treated with anisole (0.7 ml.) and trifluoroacetic acid (2.8 ml.). After 5 minutes at room temperature the solvents were removed in vacuo and the residue partitioned between ethyl acetate and water containing a small amount of trifluoroacetic acid. The aqueous layer was separated and freeze-dried to give the diacid salt (372 mg.) as an amorphous solid, M.P. ca. 165° (decomp.), $[\alpha]_D$ −41.0° (1%—$NaHCO_3$), $\lambda_{max}$. (0.1 M—pH 6 phosphate buffer) 309 nm. ($\epsilon$ 20,700), $\nu_{max}$. ($CHBr_3$), 1780 (β-lactam), 1710 and 2620 ($CO_2H$), 1690 cm.$^{-1}$ ($CF_3CO_2^-$), τ ($D_2O$—$NaHCO_3$) 2.37 and 4.06 (CH=CH two d, J 16 Hz.), 4.27 ($C_{(7)}$—H, d, J 4.5 Hz.), 4.77 (C$\underline{H}$CONH, s), 4.92 ($C_{(6)}$—H, d, J 4.5 Hz.), and 6.54 ($C_{(2)}$—$CH_2$, s), $R_F$ 0.05 (System B). (Found: C, 45.76; H, 3.4; F, 11.25; N, 8.15; S, 6.2. $C_{20}H_{18}F_3N_3O_8S\frac{1}{2}H_2O$ requires C, 45.6; H, 3.65; F, 10.85; N, 8.0; F, 11.0; S, 6.1%.)

EXAMPLE 7

(a) 3-acetoxymethyl-7β-(2-thienylacetamido)ceph-2-em-4-carboxylic acid

A solution of 3-acetoxymethyl-7β-(2-thienylacetamido)ceph-3-em-4-carboxylic acid (146.5 g.) in pyridine (600 ml.) was treated with acetic anhydride (45 ml.) and the mixture stirred vigorously at 22° for 45 minutes. The material which crystallised out was isolated by filtration, washed with pyridine and ethyl acetate, and dried in vacuo to give the pyridinium salt of title compound (95.15 g., 54.5%). This pyridinium salt was stirred with water (350 ml.) and ethyl acetate (700 ml.) and 2 N-hydrochloric acid (ca. 120 ml. added until all the solid had dissolved. The organic phase was separated, washed with water, dried and evaporated in vacuo to give the title compound (77 g.) as a white solid, M.P. 151–152.5°, $[\alpha]_D$ +480° (5% sodium carbonate), $\lambda_{max}$. 235 nm. ($\epsilon$ 15,200), $\nu_{max}$. 3293 (NH), 1746 (β-lactam), 1722 and 2600 ($CO_2H$), 1722 and 1208 ($CH_2OCOCH_3$) and 1660 and 1528 cm.$^{-1}$ (CONH), τ ($D_2O$-sodium bicarbonate) 2.7 and 3.0 (thienyl, 1-proton t and 2-proton d), 3.62 ($C_{(2)}$—H, broad s), 4.58 ($C_{(7)}$—H, d, J, 4.5 Hz.), 4.69 ($C_{(6)}$—H, d, J 4.5 Hz.), 5.1 ($C_{(4)}$—H, broad s), 6.15 ($C\underline{H}_2CONH$, s) and 7.9 (—OCO$C\underline{H}_3$, s) ($C\underline{H}_2$OAc obscured by $H_2O$ band). (Found: C, 48.3; H, 4.1; N, 7.0; S, 16.2. Calc. for $C_{16}H_{16}N_2O_6S_2$: C, 48.4; H, 4.05; N, 7.05; S, 16.15%.)

(b) 3-hydroxymethyl-7β-(2-thienylacetamido)ceph-2-em-4-carboxylic acid

A suspension of 3 - acetoxymethyl - 7β - (2-thienylacetamido)ceph-2-em-4-carboxylic acid (42 g.) in water (400 ml.) was flushed with nitrogen and potassium carbonate (43 g.) added. The mixture was treated with water (200 ml.) to effect complete solution and methanol (50 ml.) added. The solution was stored at 37° for 4.25 hours and then at 22° for 17 hours. The methanol was removed in vacuo and the mixture diluted with water (200 ml.) and stirred with ethyl acetate (800 ml.). The pH of the mixture was adjusted to 2.5 with orthophosphoric acid and the organic layer separated and washed with water and dried. The ethyl acetate was evaporated in vacuo until crystallisation of the product started, and the mixture cooled. Filtration gave the title compound (19.7 g., 52.5%) as fine needles, M.P. 151.5–152° (decomp.), $[\alpha]_D$ +465° (tetrahydrofuran), $\lambda_{max}$. 234 nm. ($\epsilon$ 14,400), $\nu_{max}$. 3250 (NH and bonded OH), 2600 and 1725 ($CO_2H$), 1755 (β-lactam) and 1650 and 1520 cm.$^{-1}$ (CONH), τ ($D_2O$-sodium bicarbonate) 2.65 and 3.0 (thienyl, 3-proton complex), 3.7 ($C_{(2)}$—H, broad s), 4.62 ($C_{(7)}$—H, d, J 4.5 Hz.), 4.74 ($C_{(6)}$—H, d, J 4.5 Hz.), 5.15 ($C_{(4)}$—H, broad s), 5.8 ($C\underline{H}_2OH$, broad s) and 6.12 ($C\underline{H}_2CONH$, s). (Found: C, 47.4; H, 4.05; N, 7.65; S, 18.0. Calc. for $C_{14}H_{14}N_2O_5S_2$: C, 47.5; H, 3.9; N, 7.9; S, 18.1%.)

(c) Diphenylmethyl 3-hydroxymethyl-7β-(2-thienylacetamido)ceph-2-em-4-carboxylate A solution of 3 - hydroxymethyl - 7β-(2-thienylacetamido)cephen-2-em-4-carboxylic acid (19.3 g.) in dry, peroxide-free, tetrahydrofuran (400 ml.) was treated with an excess of a ca 10% solution of diphenyldiazomethane in petroleum ether. The mixture was stored at 22° for 18 hours, then treated with methanol (2.5 ml.) and glacial acetic acid (4 ml.), and the solvents removed in vacuo. The residual solid was washed with ether to give the title compound (25.84 g., 91%), M.P. 169–170° (decomp.), $[\alpha]_D$ +383° (tetrahydrofuran), $\lambda_{max}$. 236 nm. ($\epsilon$ 14,100), $\nu_{max}$. ($CHBr_3$) 3610 (OH), 3420 (NH), 1780 (β-lactam), 1745 ($CO_2R$) and 1680 and 1515 cm.$^{-1}$ (CONH), τ (DMSO—$d_6$) 3.46 ($C_{(2)}$—H, broad s), 4.5 ($C_{(7)}$—H, dd, J 8.5 and 4.5 Hz.), ca. 4.8 ($C_{(6)}$—H, and $C_{(4)}$—H, m) 5.95 ($C\underline{H}_2OH$, broad s) and 6.16 ($C\underline{H}_2CONH$, s), (Found: C, 62.4; H, 4.7; N, 5.3; S, 11.8' $C_{27}H_{24}N_2O_5S_2$ requires C, 62.5; H, 4.45; N, 5.4; S, 12.35%.)

(d) Diphenylmethyl 3-formyl-7β-(2-thienylacetamido)ceph-2-em-4-carboxylate

A solution of diphenylmethyl 3-hydroxymethyl-7β-(2-thienylacetamido)ceph-2-em-4-carboxylate (10.41 g.) in freshly distilled acetone (500 ml.) was stirred at 0° and treated with Jones' reagent (6.5 ml., 1.3 equiv.) over a five-minute period. After 40 minutes a further amount (1 ml.) of Jones' reagent was added, and after a further 10 minutes the reaction was judged complete on examination by T.L.C. (System E). The mixture was poured into saturated brine, 1500 ml., and extracted with ethyl acetate (1000 ml.). The extracts were washed with water, dried and evaporated in vacuo. The residue was taken up in ethyl acetate and the solvent evaporated in vacuo carefully until crystallisation started. The mixture was diluted with ether to complete crystallisation, and the solid collected to give the 3-formyl derivative (7.43 g., 71%) as fine needles, M.P. 141–143° (decomp.) $[\alpha]_D$ +472° ($CHCl_3$), $\lambda_{max}$. 285.5 nm. ($\epsilon$ 17,800), $\lambda_{max}$. ($CHBr_3$) 3460 (NH), 2760 (CHO), 1783 (β-lactam), $\overline{1744}$ ($CO_2R$), 1690 (—C=C—CO) and 1680 and 1510 cm.$^{-1}$ (CONH), τ ($CDCl_3$) 0.72 (CHO), 2.58 ($C_{(2)}$—H, broad s), 3.18 (C$\underline{H}$Ph$_2$), 4.50 ($C_{(4)}$—H, broad s), 4.56 ($C_{(7)}$—H, part of a dd J 4.5 Hz.), 4.86 ($C_{(6)}$—H, d, J 4.5 Hz.) and 6.20 (C$\underline{H}_2$CONH). (Found: C, 62.8; H, 4.4; N, 5.4; S, 12.5. $C_{27}H_{22}N_2O_5S_2$ requires C, 62.5; H, 4.25; N, 5.4; S, 12.35%.)

(e) Diphenylmethyl 3-(trans-2-ethoxycarbonylvinyl)-7β-(2-thienylacetamido)ceph-2-em-4-carboxylate A solution of diphenylmethyl 3-formyl-7β-(2-thienylacetamido)ceph-2-em-4-carboxylate (1.14 g.) in methylene dichloride (20 ml.) was treated with a solution of ethoxycarbonylmethylenetriphenylphosphorane (770 mg.) in methylene dichloride (25 ml.). The solution was stirred for 6½ hours at 20°, then left at —10° for 18 hours. The organic solution was washed with 2 N-hydrochloric acid, and water, dried, and evaporated in vacuo. The resulting cream-coloured foam was crystallised from methanol to give the vinyl compound (790 mg., 61.5%) as needles, M.P. 154–155°, [α]$_D$ +480° ($CHCl_3$), λ$_{max}$. 308 nm. (ε 23,800), ν$_{max}$. ($CHBr_3$) 3450 (NH), 1777 (β-lactam), 1740 ($CO_2R$), 1700 and 1260 (C=C—$CO_2R$), 1690 and 1505 (CONH), 1620 (C=C) and 970 cm.$^{-1}$ (trans C=C), τ 2.86 and 4.11 (C$\underline{H}$=C$\underline{H}$, two d, J 16 Hz.), 3.31 ($C_{(2)}$—H, broad s), 4.49 ($C_{(7)}$—H, dd J 9 and 4.5 Hz.), 4.71 ($C_{(4)}$—H, broad s), 4.75 ($C_{(6)}$—H, d, J 4.5 Hz.), 6.17 (C$\underline{H}_2$CONH) and 5.81 and 8.72 (OCH$_2$CH$_3$, q and t). (Found: C, 63.5; H, 4.8; N, 5.3; S, 10.95. $C_{31}H_{28}N_2O_6S_2$ requires C, 63.4; H, 4.8; 4.75; S, 10.9%.)

EXAMPLE 8

Diphenylmethyl 3-(trans-2-methylcarbonylvinyl)-7β-(2-thienylacetamido)ceph-2-em-4-carboxylate A solution of diphenylmethyl 3-formyl-7β-(2-thienylacetamido)ceph-2-em-4-carboxylate (116 mg.) in benzene (3 ml.) was treated with a solution of methylcarbonylmethylenetriphenylphosphorane (150 mg.) in benzene (4 ml.) and the mixture refluxed for 5.75 hours. The organic solution was washed with 2 N-hydrochloric acid and water, dried and evaporated in vacuo. The residual gum (186 mg.) was purified by preparative T.L.C. (Kieselgel HF$_{254+366}$, developed five times with benzene-ethyl acetate=8:1) to give the title compound (32 mg., 27%) as a gum, λ$_{max}$. ($CHCl_3$) 318 nm. (qualitative), τ ($CDCl_3$) 3.00 and 3.86 (CH=CH, two d, J 16 Hz.), 3.12 (C$\underline{H}$Ph$_2$), 3.27 ($C_{(2)}$—H, broad s), 4.47 ($C_{(7)}$—H, dd, J 8 and 4 Hz.), 4.73 ($C_{(6)}$—H, d, J 4 Hz.), 4.69 ($C_{(4)}$—H, broad s), 6.16 (C$\underline{H}_2$CONH) and 7.91 (COC$\underline{H}_3$).

EXAMPLE 9

Diphenylmethyl 3-(trans-2-ethoxycarbonylvinyl)-7β-(2-thienylacetamido)ceph-3-em-4-carboxylate A solution of diphenylmethyl 3-(trans-2-ethoxycarbonylvinyl)-7β-(2-thienylacetamido)ceph-2-em - 4 - carboxylate (234 mg.) in methylene dichloride (2 ml.) was cooled to 0° and treated with pure acetic anhydride (1 drop) and peracetic acid (0.075 ml.). After 20 minutes a further amount (0.02 ml.) of peracetic acid was added. After a total of 70 minutes the mixture was diluted with methylene chloride and the organic solution washed with saturated sodium bicarbonate, and water and dried and evaporated. The residue was dissolved in chloroform and the solution run into petroleum ether to give the Δ$^3$-sulphoxide (174 mg. 76%) as an amorphous solid, τ (DMSO—d$_6$) 1.41 (NH, d, J 9 Hz.), 2.17 and 3.67 (CH=CH, two d, J 16 Hz.), 3.95 ($C_{(7)}$—H, dd, J 9 and 4.5 Hz.), 4.94 ($C_{(6)}$—H, d, J 4.5 Hz.), 5.55 and 6.41 ($C_{(2)}$—CH$_2$, AB—q, J 18 Hz.), 5.85 and 8.74 (OCH$_2$CH$_3$, q and t) and 6.09 (C$\underline{H}_2$CONH). The p.m.r. spectrum showed the presence of ca. 10% of a Δ$^2$-compound.

The sulphoxide (117 mg.) in methylene dichloride (2.5 ml.) was cooled to —20° and treated with a solution of PBr$_3$ (79 mg.) in methylene dichloride (0.7 ml.). After 22 minutes the mixture was diluted with more methylene dichloride and washed with aqueous sodium bicarbonate and water and dried and evaporated in vacuo. The residue (100 mg.) was triturated with methanol to give a pale yellow solid. This material had a p.m.r. spectrum very similar to that of authentic product, showing only trace amounts of a Δ$^2$-impurity.

Biological results of certain of the compounds prepared in the examples are given in Table V below.

TABLE V

| Compound | Tube dilution assay (γ/ml.) | | | | | | | |
|---|---|---|---|---|---|---|---|---|
| | Gram positive | | | | | Gram negative | | |
| | Staph. aureus 604 | Staph. aureus 663 | Staph. aureus 3452 | Staph. aureus 11127 | Strep. faecalis 850 | E. coli 573 | S. typh 804 | Pr. mirab 431 |
| 1c | 3.1 | 0.1 | 8 | 31 | 4 | 8 | 8 | <4 |
| 2b | 25 | 12.5 | 16 | 16 | 16 | 31 | 4 | <0.5 |
| 3b | 2.5 | 0.6 | 2 | 2 | 16 | 31 | 8 | 4 |
| 4b | 2.5 | 2.5 | 2 | 1 | 2 | 4 | 4 | 8 |

We claim:

1. In a process for the preparation of compound of the formula

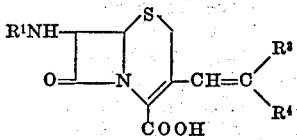

wherein R$^1$ is carboxylic acyl or 1–20 carbon atoms and each of R$^3$ and R$^4$ is a member selected from the group consisting of H, lower alkyl, cyclopentyl, cyclohexyl, phenyl, nitrophenyl, benzyl, phenylethyl, lower alkoxycarbonyl, aryl and diaryl loweralkoxycarbonyl in which the aryl moiety is phenyl, halophenyl or tolyl, lower alkylcarbonyl and cyano, the step of reacting a compound of the formula

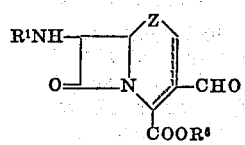

wherein R$^1$ has the meaning given above, Z is >S or >S→O, R$^6$ is a carboxyl protecting group and the interrupted lines between the 2,3- and 3,4-C atoms represent a single or double bond with one of said bonds being a single bond and the other a double bond with a phosphorane ylid of the formula

wherein R$^3$ and R$^4$ have the above defined meaning and R is a member selected from the group consisting of $C_3$–$C_{10}$ alkyl, C$_5$ or C$_6$ cycloalkyl, phenyl and diloweralkylamino, at least one of R$^3$ and R$^4$ being lower alkoxycarbonyl, aryl or diaryl loweralkoxycarbonyl in which the aryl moiety is phenyl, halophenyl or tolyl, lower alkylcarbonyl or cyano when a Δ$^3$-cephalosporin is reacted.

2. A process as claimed in claim 7 wherein at least one of R$^3$ and R$^4$ is lower alkoxycarbonyl, aryl or diaryl loweralkoxycarbonyl in which the aryl moiety is phenyl, halophenyl or tolyl, lower alkylcarbonyl or cyano.

3. A process as claimed in claim 1 carried out at a temperature of from −80 to +100° C.

4. A process as claimed in claim 1 carried out in an inert solvent selected from the group consisting of methylene chloride, benzene, diethyl ether, tetrahydrofuran, dioxan, dimethyl formamide, dimethylacetamide and hexamethylphosphoramide.

References Cited

UNITED STATES PATENTS 3,573,296    3/1971    Johnson et al. ____ 260—243 C

NICHOLAS S. RIZZO, Primary Examiner

U.S. Cl. XR.

424—246, 271